United States Patent
Heurtley

[15] 3,687,535
[45] Aug. 29, 1972

[54] OPTICAL DEMODULATION SYSTEM

[72] Inventor: John C. Heurtley, Webster, N.Y.

[73] Assignee: Xerox Corporation, Rochester, N.Y.

[22] Filed: Feb. 13, 1970

[21] Appl. No.: 11,251

[52] U.S. Cl. ............................353/20, 350/162 SF
[51] Int. Cl. ..........................................G03b 21/14
[58] Field of Search ..................350/162 SF; 353/20

[56] References Cited

UNITED STATES PATENTS

| | | | |
|---|---|---|---|
| 3,470,310 | 9/1969 | Shashoua | 178/5.2 |
| 3,533,340 | 10/1970 | Macousk | 95/12.2 |
| 3,536,376 | 10/1970 | Henning | 350/161 |
| 3,493,287 | 2/1970 | Lohmann | 350/162 |
| 3,378,633 | 4/1968 | Macousk | 178/5.4 |

Primary Examiner—Leonard Forman
Assistant Examiner—Steven L. Stephan
Attorney—James J. Ralabate, Donald F. Daley and Thomas J. Wall

[57] ABSTRACT

Optically screened input information is recorded as excursions on the surface of a thermoplastic film. The excursions basically consist of a periodic carrier wave and a modulating signal containing the input information. Highly coherent light is directed incident upon the image bearing surface whereby the signal modulated deformations thereon cause the light to become diffracted. The diffracted light is then passed through a projection system including a spatial filter which is positionable in the focal plane of the system. The filter comprises a thin opaque mask having two clear apertures therein, which, when the mask is positioned in the systems focal plane, are coincident with the two first diffracted order focal spots, the two apertures being of a size capable of passing the modulated side bands of the input signal. The mask also has a third aperture centered about the optical center line of the system and being of a size such that the Airy disc of the zero diffracted order just fills, or preferably, slightly more than fills the central aperture when the two first diffracted order focal spots are centered in the other two apertures. The optical path length of one of the light beams passing through the filter is retarded in relation to the other beams whereby interference between the light beams is produced at the scan plane of the system.

11 Claims, 5 Drawing Figures

PATENTED AUG 29 1972 3,687,535
SHEET 1 OF 2
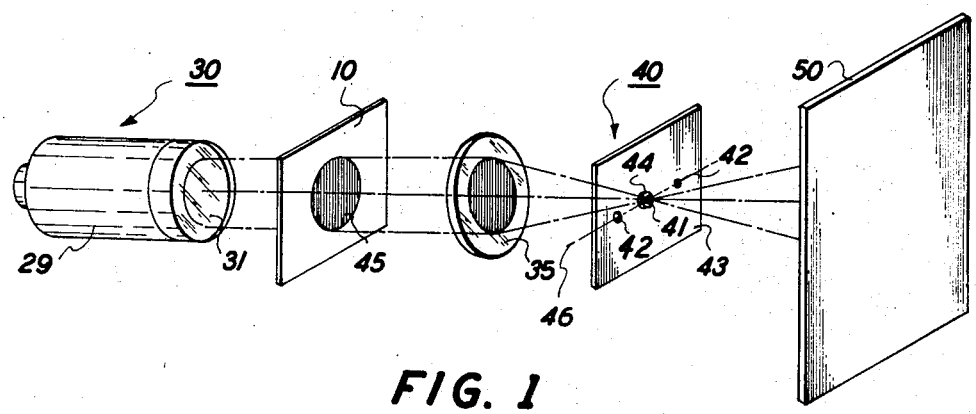
FIG. 1
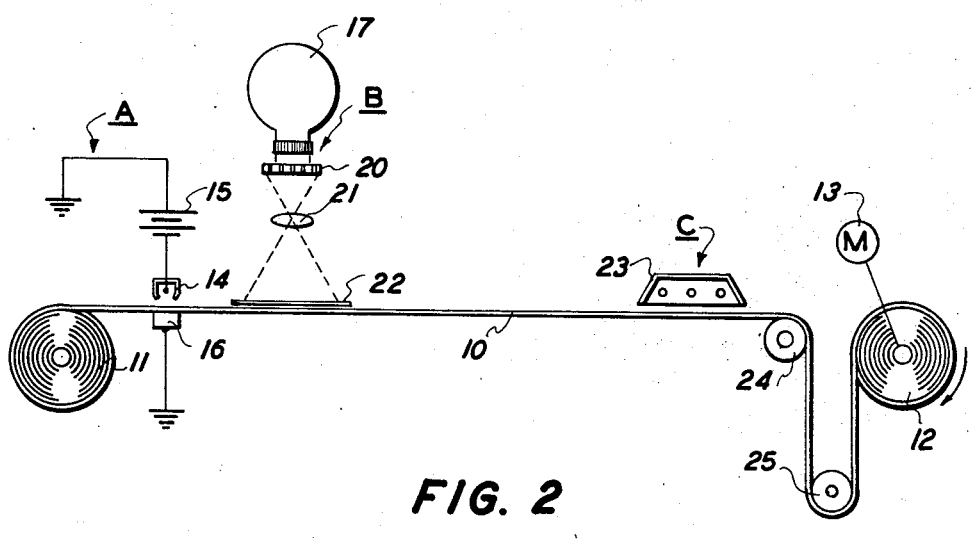
FIG. 2
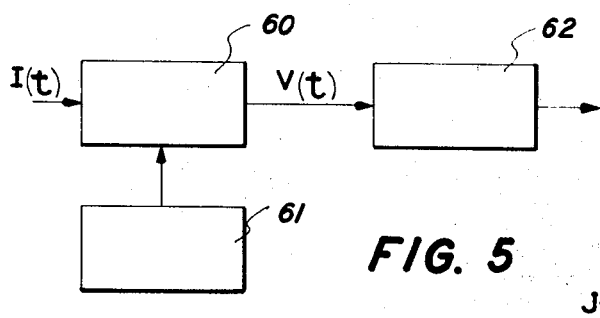
FIG. 5
INVENTOR.
JOHN C. HEURTLEY
BY 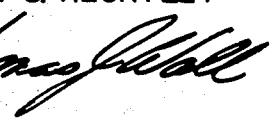
ATTORNEY

OPTICAL DEMODULATION SYSTEM

This invention relates to imaging and, in particular, to efficiently recovering an input scene recorded as excursions on the surface of a deformable thermoplastic receptor.

More specifically, this invention relates to deformable thermoplastic xerography. In thermoplastic xerography originally disclosed by Gundlach and Claus in the Jan.-Feb. 1963 issue of the Journal of Photographic Science and Engineering, an image of an original to be reproduced is recorded in the form of surface wrinkles or deformations upon the surface of a thermoplastic insulating material. As in conventional xerography, the receptor surface is first uniformly charged and then exposed to a light image of an original to selectively dissipate the charge thereon in image configuration. In thermoplastic xerography, the latent electrostatic image is developed simply by heating or softening the thermoplastic material to wherein the material deforms in response to the latent image. In relief imaging, the electrostatic latent image containing the original input scene information is created on the receptor surface while the receptor material is in a hardened or cool state. When heated, the surface deforms only in response to a difference in charge density found between the image and non-imaged areas. In frost imaging, on the other hand, the latent electrostatic image is applied to a pre-softened or heated receptor surface. In this latter process, the deformation pattern of the latent electrostatic image is superimposed upon a vast number of randomly scattered noise depressions. Because the original input signal information more or less modulates the random noise carrier, the frost process is responsive to low frequency input and therefore can be employed to record continuous or half-toned images. It was later found that the frequency response characteristics of both the frost and relief imaging systems dramatically improved by optically screening the original input scene information in a manner such that the phase image formed on the receptor surface comprises a periodic carrier wave and a modulating signal containing the original input information. By matching the repetition frequency of the periodic carrier wave to that of the hydrodynamic resonant range of the thermoplastic film, the frequency response characteristics of the imaging system can be further improved. The effects of optical screening, as applied to thermoplastic xerography, can be more thoroughly understood by reference to Urbach article in the Sep.-Oct. 1966 issue of the Journal of Photographic Science and Engineering as well as his U. S. Pat. No. 3,436,216.

Regardless of the imaging techniques employed, all forms of thermoplastic or, as sometimes called, deformable xerography are characterized by the formation of a phase image on the receptor surface. By definition, a phase image is one that does not absorb light but merely redirects the light either by diffraction or refraction. Because of this unique characteristic, a phase object is extremely difficult to detect with the naked eye or with most image detecting devices which, as the eye, are only sensitive to change in image intensity. Suzuki et al, in the July 1964 issue of Applied Optics, presents a theoretical treatment of the subject of recovering phase images and, in particular, recovering of phase images in thermoplastic xerography. Suzuki suggests that highly coherent light be directed incident upon a screened phase image and the diffracted light then passed through a projection lens. A demodulating filter, positioned in the back focal plane of the lens, separates the image information from the carrier signal by blocking the carrier while passing input information to the scan plane of the lens. The Suzuki filter simply consists of an opaque mask having one clear aperture therein which is centered about one of the first diffracted spectra associated with the screened frequency and which is small enough to block all other spectra. Although the Suzuki filter is simple in construction, it nevertheless is relatively inefficient in operation in that it can pass only a relatively small amount of the total illumination supplied to the system. This, of course, means that the intensity of the recovered signal must also be relatively weak thus making this type recovery system impractical for use in high speed image recovery systems or read-out devices.

It is therefore a primary object of this invention to improve image read-out systems particularly in the field of deformable thermoplastic xerography.

Another object of this invention is to improve method and apparatus for recovering a phase image which has been recorded in the form of surface deformations or wrinkle upon the surface of a thermoplastic receptor.

Yet another object of this invention is to improve deformable xerography by providing a read-out system for recovering images having a relatively high intensity.

A further object of this invention is to improve method and apparatus for recovering a phase image wherein the recovered image is of an intensity capable of being sensed by automatic detection means.

These and other objects of the present invention are attained by means of a spatial filter positionable in the focal plane of an optical system for recovering a phase image recorded as surface deformations, the image including a periodic carrier wave and an amplitude modulating signal containing the original input information. The receptor is positioned in the system and illuminated by means of highly coherent light source in a manner such that the light is diffracted and caused to pass through the filter. The filter comprising a thin opaque mask having two apertures therein each of which are centrable about a diffracted order associated with the carrier wave frequency and being of a size sufficient to pass the modulated side band spectra of the input signal, and a central aperture positionable about the central axis of the system and being of a size such that the Airy disc of the zero diffracted order will just fill, or preferably, slightly more than fill the central aperture when the two other apertures are centered about their associated diffracted orders.

For a better understanding of the present invention as well as other objects and features thereof, reference is had to the following detailed description of the invention to be read in connection with the accompanying drawings wherein:

FIG. 1 is a perspective view of a device for projecting and recovering an image recorded as a deformation on the surface of a thermoplastic receptor in accordance with the present invention;

FIG. 2 is a side view of an exemplary apparatus for preparing a thermoplastic receptor adapted for use in the projection and recovering system shown in FIG. 1;

FIG. 5 is a block diagram showing a method for detecting the recovered signal in the scan plane of the illumination system shown in FIG. 1.

Figure 3:
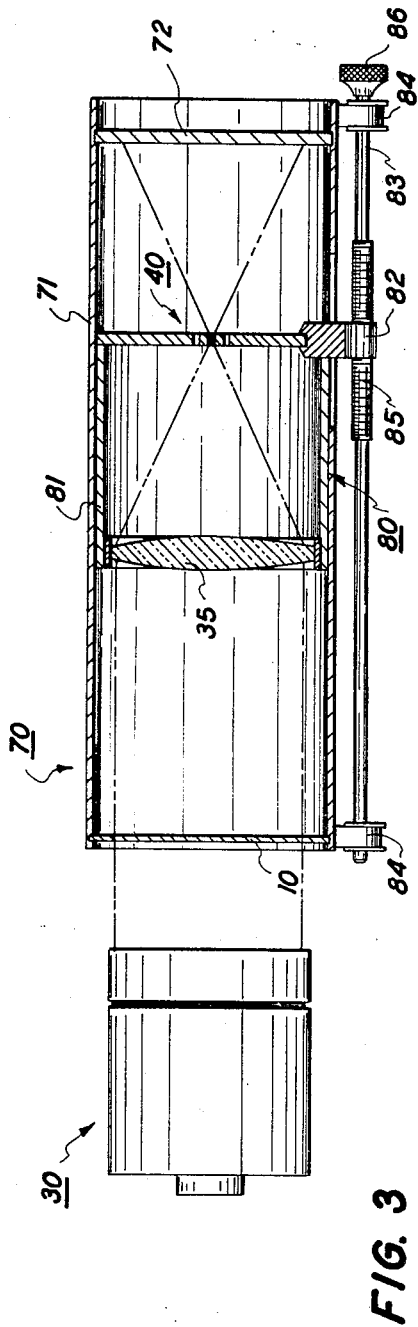
FIG. 3 is another embodiment of the apparatus shown in FIG. 1 illustrating means to reposition the optical filter in relation to the image plane or the scan plane of the projection system.

In thermoplastic xerography, the surface of a softenable insulating receptor is electrostatically imaged and the receptor material than softened to a point whereby the surface wrinkles in response to the image. Any number of techniques may be employed to image the receptor surface, however, it is generally preferred that the receptor be made photoconductive so that the input information can be stored thereon by means of conventional xerographic methods. It has been found that many thermoplastic materials can be made photoconductive by simply dispersing or copolymerizing the thermoplastic resin with a photoconductive material. Another common practice is to blend a plastic polymer with a complexing agent so as to form a photoconductive complex, as for example, by complexing the polymer of phenolformaldehyde with 2, 4, 7-trinitrofluorenone or any other suitable Lewis acids. Typical photoconductive materials include inorganics such as selenium, cadmium, selenide, cadmium sulfide, zinc sulfide, zinc selenide, zinc oxide, lead oxide, lead sulfide, mercuric sulfide, antimony sulfide, mercuric oxide, indium trisulfide, titaniu, dioxide, arsenic sulfide, gallium triselenide, zinc cadmium sulfide, lead iodide, lead selenide, lead telluride, gallium telluride, mercuric selenide and the iodide, sulfide, selenide and tellurides of bismuth, aluminum and molybdenum as well as organic photoconductors especially when these are complexed with small amounts of suitable Lewis acids. Typical of these organic photoconductors are 1,4-dicyanonaphthalene; anthracene, 3-benzilidene-aminocarbozole; 2,5-bis(p-aminophenyl-1)-1,3,4-oxidiazole; vinyl carbazole; 2,4-diphenyl-quinazoline; 1-methyl-2(2′, 4′-dihydroxy-methylene-phenol)-benzimidazole and substituted and unsubstituted phthalocyanines and quinacridones.

Although the practice of the present invention will be described in regard to a photoconductive thermoplastic receptor, it should be made clear that the present invention can also be practiced in conjunction with non-photoconductive insulating materials by producing the desired electrostatic charge pattern by means of such well known techniques as electron beam recording, electrostatic discharge recording, charge transfer or the like. Similarly, a single component layer of thermoplastic insulating material can be used when the thermoplastic is laminated or held in contact with a photoconductive substrate in a known manner so that the photoconductive material is used to control the amount of charge deposited on the thermoplastic surface. Furthermore, because most thermoplastic receptors are made in the form of thin films, it is desirable to coat the thermoplastic film upon a relatively rigid conductive substrate whereby gross distortion of the material is prevented when the material is softened during development. Conventionally, aluminum, brass, copper and heat resistant polymers such as polycarbonates and polyurethanes having thereon thin transparent conductive layers such as tin oxide or the like are employed as suitable conductive substrate materials.

Apparatus for processing a photoconductive thermoplastic insulating material in order to store input information thereon is illustrated in FIG. 2. A web of photoconductive thermoplastic material, similar to that as described above, is fed on a supply spool 11 and the web operatively connected to a take-up spool 12. The web is caused to move over a predetermined path of travel through the various processing stations as the take-up spool is driven in the direction indicated by means of motor 13.

The first processing station in the direction of web travel is a charging station A, wherein a uniform charge is applied to the top surface of the thermoplastic receptor by means of a corona generating device 14 similar to that disclosed by Vyverberg in U. S. Pat. No. 2,836,725. The corona generating device is mounted in close proximity to the top surface and extends horizontally across the entire web surface. In operation, the web is drawn over grounded electrode 16, and the corona generator energized by means of a suitable power supply 15 to uniformly charge the entire surface of the web.

The next subsequent processing station in the direction of web travel is an exposure station B in which is mounted an actinic light source projector 17. The projector is arranged to direct a light through an input scene 20 of the original to be recorded and then through a lens 21 onto the uniformly charge web surface to selectively dissipate the charge in image configuration. However, before the light image of the original can selectively dissipate the charge, the projected light must first pass through an optical screen grating 22 which is secured adjacent to and in close parallel relation with the top surface of the web. Although any suitable optical screening device may be employed, it is preferred that the screen has substantially parallel opaque areas thereon having a repetition frequency such that the projected screen image creates an electrostatic pattern on the photoconductive web surface of a frequency within the hydrodynamic resonant range of the plastic material. In practice, it has been found that the frequency of the screen occurrence should be approximately in a range of about 1.5 to about 2.7 times the thickness of the thermoplastic receptor film. When the thickness of the film, however, is less than 2 microns, the frequency of occurrence should be preferably in the range of about 1.5 to 5 times the thickness of the film.

In imaging the plastic film in the above manner, a latent electrostatic image is formed having the input scene information superimposed upon an image of the periodic screen grating. Upon softening of the receptor film, a periodic or sinusoidal carrier wave is formed upon the film surface and the carrier wave is amplitude modulated by the input scene information. For example, if the surface deformation modulation corresponds to an input object scene of uniform background, the sinusoidal carrier will be of constant amplitude. More generally however, the modulating signal will produce a change in the amplitude of the carrier wave in accordance with variations in the optical density of the original input object scene.

Simultaneous exposure of the input scene and the screen grating is preferred because the degree of modulation obtained is superior to that produced by a sequential imaging system. However, it should be clear that any method of operation may be employed that will form a pattern in which the resulting surface deformations are comprised of a periodic or sinusoidal carrier wave having a recurrence frequency at approximately the resonant frequency of the thermoplastic material and which is amplitude modulated by the input scene information to be recorded and stored on the receptor surface.

Once the screened charge pattern is formed on the photoconductive surface, the web is drawn beneath an electrical resistance heater 23 adapted to soften a thermoplastic material to or slightly beyond, the threshold temperature condition of which the charged field associated with the latent image causes the material to deform. Although a heating means is provided herein, both liquid or vapor solvent treatment can be similarly employed to soften the plastic web sufficiently to allow the material to deform in response to the latent image. The deformed web is then passed over a series of guide rollers 24 and 25 arranged to form a cooling loop of sufficient length whereby the thermoplastic material is allowed to cool and return to a normal hardened state. The rehardened thermoplastic web is then stored on take-up spool 12 until such time as a read-out of the stored information is desired.

A read-out system embodying the techniques of the present invention for recovering the input information is shown in FIG. 1. The developed thermoplastic material 10 is positioned in the image plane of the system directly in front of light source 30. The light source basically comprises a housing 29 containing a highly coherent source of light, as for example, a laser, and the light passed through a collimating lens 31 whereby plane light is directed incident upon the back surface of the transparent web. The plane wavefront of collimated light passes through the developed thermoplastic film substantially normal to the image plane and the light is diffracted by the signal modulated surface deformation thereon. The diffracted light is then passed through a projection lens 35 whereby the spatial spectrum of the recorded surface deformations is displayed as a series of focal spots in the back focal plane of the lens.

As disclosed by Suzuki, in the above noted article, the original input scene can be recovered by spatially filtering the diffracted light in the focal plane of the read-out lens. The filter suggested by Suzuki consists of an opaque mask having a single clear aperture therein which is centrable about one of the first diffracted orders associated with the periodic carrier frequency and which effectively blocks all other frequencies from reaching the read-out plane. As noted, the Suzuki device therefore must be relatively inefficient in that most of the light energy fed into the system never reaches the read-out plane, it having been blocked by the filter, and it follows therefore that the intensity of the image recovered must also be relatively weak.

In the present invention, a filter 40 is employed capable of passing a plurality of diffracted light beams in a manner wherein the intensity of the read-out image is raised to a relatively high level. The present filter 40 (FIG. 1) is structurally composed of a thin opaque mask 43 having a central aperture 41 and two other clear apertures 42 formed therein. When the mask is positioned in the back focal plane of lens 35, as shown in FIG. 1, the two outer apertures 42 and the central aperture 41 all lie on a common center line 46 passing through the optical center line of the read-out system and which is substantially perpendicular to the direction of carrier wave screen generators 45. The central aperture is of a size equal to or slightly less than the size of the Airy disc of the zero order diffracted wave.

The other two outer apertures 42 are centered about the focal spots associated with some other diffracted orders associated with the carrier wave frequency. Although any diffracted order may be employed in the practice of the present invention, it is preferred that the outer apertures 42 be centered about the focal spots associated with the two first diffracted orders and that they be of a size sufficient to pass the modulation side bands centered about the screened spectra corresponding to the information in the original input scene. The two outer apertures, when tuned to the first diffracted orders in this manner, will be symmetrically positioned about the central aperture as shown in FIG. 1.

In this preferred embodiment of the instant invention, a phase plate 44 is mounted in the mass at the central aperture and is arranged to intercept the zero order diffracted light beam. The phase plate is optically prepared to retard the light passing through the central aperture approximately one-quarter of a wave length to produce interference between the diffracted light beams at the read-out or scan plane of the system thereby enhancing the recovered image. Although the phase plate is shown positioned at the central aperture, it should be clear to one skilled in the art that the plate could be positioned at any one of the apertures as long as it functions to retard the light passing through the aperture in relation to the other diffracted light beam. It should further be clear to one skilled in the art, that the light retarding means need not be limited to so called phase plate but may be any means capable of retarding the light passing therethrough and may include prisms, liquid medias, so called rotars, or even optical active materials such as sugar crystals or the like.

As can be seen, the image in the read-out or scan plane of the system is composed of several components. The first is a background component made up of the undiffracted light, (the Airy disc) and passes through the zero order central aperture. The second component is made up of the illumination passing through the two first diffracted order apertures. Each of these beams contains the input scene information, however, they interact at the read-out plane to give an appearance of a sinusoidally varying pattern which is a magnified replica of the original carrier wave frequency and whose amplitude is a spatially modulated function of the input object scene. This replica of the phase frequency is inherently produced when a plane wavefront of light is diffracted into two beams and then recombined in the manner shown herein. For further information concerning this phenomena reference is had to Jenkins and White, Fundamentals of Optics, beginning at page 234. A third, but relatively weak component is also present in the read-out image which is produced by the interrelation between the input scene modulation and the carrier wave frequency. This last component, however, because of its weakness, can be ignored for the most practical applications.

Because the scan or read-out image is made up of many different components, the recovered image is consideraBly brighter than that capable of being recovered when using a single aperture filter. It should also be noted that the image recovered by the present system has a sinusoidal variation in intensity having crests that are parallel to the original carrier wave screen generators 45. Although the crests are of little visual distraction they are of a distinct advantage when the read-out image is to be detected by means of automatic electrical scanning device. The crests serve as an electrical carrier, the modulation of which contains the original input scene information.

The image presented in the scan plane therefore is an amplitude modulated carrier which lends itself ideally to electrical scan detection and particularly to detection of the type employing a photosensitive detector having a response capable of recovering a signal voltage proportional to the intensity of the scanned image. By use of proper filtering techniques, a scan output signal can be readily isolated having the form:

$$O(t) = K [M(t) M(t) \cos (f_s t) + \hat{M}(t) \sin (f_s t)]$$

where:

$K$ is a constant depending upon the particular photoelectric scanner employed and is linearly proportional to the screen frequency deformations on the receptor surface, $M(t)$ and $\hat{M}(t)$ represent the modulated spectra, both of which are linearly proportional to the original input object scene modulation, $\cos (f_s t)$ represents the carrier weave frequency in terms of the original screen frequency, and $\sin (f_s t)$ is the analogous quadratic component.

Either the $M(t)$ or $\hat{M}(t)$ modulation can be recovered separately by synchronous detector techniques. In general, however, the $M(t)$ modulation is the desired component to be recovered from $O(t)$. A method of recovering this modulation is illustrated in block diagram form in FIG. 5. The modulated signal is first sent to a multiplier 60 where it is mixed with the output of a local oscillator 61. The input from the local oscillator to the multiplier is selected so as to be equal to:

$$B \cos (f_s t)$$

where B is a constant of proportionality.
which of the same frequency and in phase with scan input carrier component $\cos (f_s t)$ whereby the output of the multiplier will be:

$$V(t) = KBM(t) \cos^2 (f_s t) t + \hat{KM}(t) B \sin (f_s t) \cos (f_s t).$$

$$= 1/2 \text{ KBM} (t) [1 = \cos 2(f_s t)] + 1/2 \hat{KBM} (t) \sin 2 (f_s t)$$

Passing the signal through low pass filter 62 results in the modulated component of the signal $M(t)$ being recovered and the unwanted components $M(t) \cos 2(f_s t)$ and $\hat{M}(t) \sin 2(f_s t)$ being effectively blocked. As can be seen, the output of the system, being linear in the domain of the original signal and the amplitude of the surface deformations, is in a form such that the read-out time and power requirements can be considerably relaxed.

A test was as conducted in which an optical read-out system was constructed as herein disclosed and a read-out of an imaged receptor obtained to determine the merits of the instant spatial filtering technique. A receptor was prepared from a transparent thermoplastic film which was imaged so that the input scene information was modulating a sinusoidal carrier wave having a known repetition frequency. The image was formulated from a transmissive sine wave target placed on a glass substrate and having 8 gray steps of varying densities Sine wave targets similar to the one herein described are commercially available from the Eastman Kodak Company, Rochester, New York. Physically, the apparatus included a sheet metal mask constructed of aluminum approximately one-sixteenth of an inch thick and arranged to be positioned in the back focal plane of a projection lens. The mask included three clear apertures, one aperture being arranged to be centered about the optical axis of the system while the other apertures were centerable about the two first diffracted order focal spots associated with the carrier wave frequency. A thin parallel glass plate (phase plate) capable of retarding light energy passing therethrough approximately one-fourth of a wavelength was positioned in the central aperture. The central aperture was tuned so that slightly less than the Airy disc of primary illumination associated with the zero order could pass therethrough. A four by five inch Polaroid film was clamped securely in the image or scan plane of the system and was employed to record the scan plane images.

The light from a coherent light source was collimated and directed incident upon the imaged screened photoreceptor surface whereby the light was diffracted. The diffracted light was then passed through a projection lens and filtered in the back focal plane thereof utilizing the spatial filter herein disclosed. The phase plate was rotated to retard the light passing through the central aperture one-quarter of a wavelength and the scan plane image recorded on standard Polaroid P.N. Type film. A series of pictures were made with the exposure time of each picture in the series being varied. In order to evaluate the results, the central aperture and one of the other apertures were blocked whereby a single aperture mask and the same exposure steps repeated. When the two sets of results were compared it showed that more gray steps were discernable after only one second of exposure employing the filter of the instant invention than were visible after a 10 second exposure using the single aperture filtering arrangement.

The scan output pictures obtained in the two compared tests were similarly compared by taking a series of microdensitometer traces of the pictures. Here again it was clearly shown that the filter of the present invention was capable of recovering a signal after a one second exposure that could not be detected when the filter was partially blocked regardless of the exposure time.

It was noted during the test period that the phase plate could be effectively eliminated without noticeably affecting the scan plane image when adjusting the optical path distance was adjusted by shifting either the image plane or the scan plane slightly in relation to the mask. FIG. 3 illustrates a read-out system which embodies the teachings of the present invention and in which the phase plate 44 is eliminated. A source of collimate light 30, similar to that herein described, is coaxially aligned with optical housing 70. The housing basically consists of an open ended support member 71 in which is secured to the various read-out components. At the left hand end of the housing, as shown in FIG. 3, there is provided means to support the imaged thermoplastic receptor 10 so that the deformed surface thereon is substantially perpendicular to the optical axis of the system. The receptor is arranged so that collimated light from the illumination source is directed incident upon the deformed surface and the light diffracted is in accordance with the carrier wave frequency. The diffracted light is then passed through a lens and filter assembly 80 and is presented on a viewing screen 72 which is supported at the opposite end or right hand side of the housing. The lens 35 and the spatial filter 40 are mounted in fixed relation to each other on a movable carriage 81 and the carriage adapted to move horizontally along the axial center line of the system. Spatial filter 40, which is similar to the one herein described, is arranged to demodulate the amplitude modulated carrier wave and present a high intensity read-out signal at the scan plane 72 of the system.

An elongated opening is provided in the side wall of the housing and a threaded drive mechanism 82, which is secured to the carriage allowed to pass therethrough. A lead screw 83 is rotatably supported external the housing in the bearing block 84 provided with the threaded portion 85 thereon operatively mated with the carriage drive mechanism 82. Turning thumb screw 86 secured to one end of the lead screw, causes the carriage to be repositioned within the housing whereby the lens and filter are also repositioned in relation to the image or scan planes of the system. In this manner the optical elements can be adjusted to obtain optimum read-out without the use of a phase plate or the like.

Figure 4:
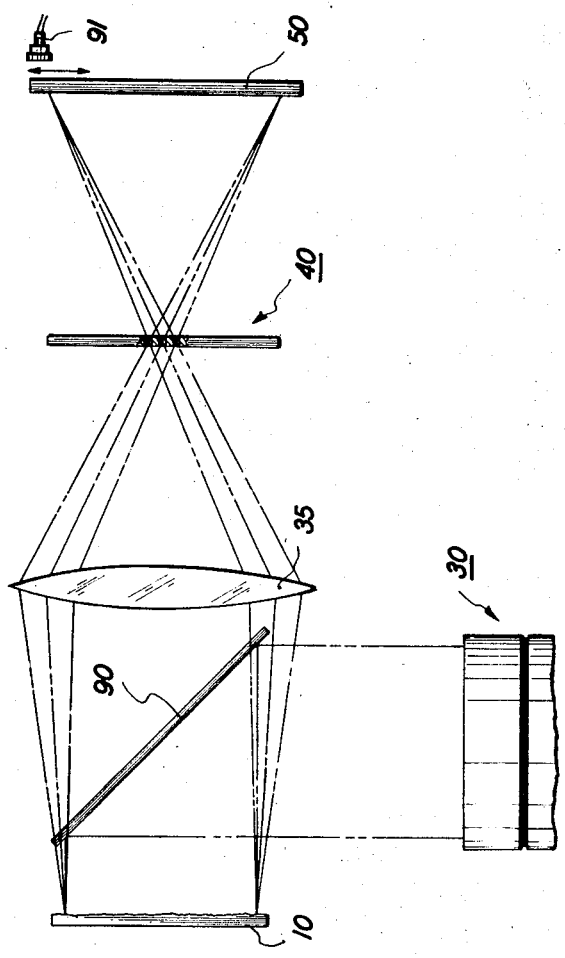
FIG. 4 is a top plan view of a device for projecting and recovering images recorded as surface deformations on a thermoplastic receptor embodying the teachings of the present invention.

It should also be made clear that the teachings of the present invention are not necessarily limited to use in conjunction with a transmissive thermoplastic receptor and that these teachings are broad enough to encompass reflective type read-out systems. FIG. 4 illustrates such a read-out system. A source of collimated light 30 is positioned off-axis in relation to the optical read-out system. The light from the source is directed incident upon a beam splitter 90 which redirects the light substantially normal to the deformed surface of the thermoplastic receptor. The diffracted light returning from the imaged surface is reflected back through the beam splitter upon a projection lens 35. The light projected by the lens is spatially filtered as described above by means of filter 40 and the output signal presented at the scan plane 50. A high speed scanning device 91 having a response capable of recording a signal voltage proportional to that of the scan plane image, is mounted behind the scan plane and is adapted to rapidly scan and record the read-out image. The output can then be demodulated and the original input scene information recovered in a manner similar to that described above. It should be further noted that the present invention is not confined to the details as set forth and this application is intended to cover further modifications and changes which may come within the scope of the following claims.

What is claimed is:

1. In an optical read-out system of the type for recovering information stored on the surface of a receptor in the form of surface deformations which comprise a periodic carrier wave and a modulating signal containing the input scene information having a source of light to illuminate the receptor surface with coherent light whereby the light is diffracted in accordance with the carrier wave frequency and a projection lens for presenting the diffracted light beams at focal spots in the focal plane of the lens, the improvement apparatus comprising a spatial filter positionable in the focal plane of the lens comprising a thin opaque mask having at least three apertures therein including a central aperture located about the focal spot of the zero diffracted order being of a size smaller than the Airy disc of illumination associated with the zero diffracted order and side apertures located about the focal spots of non-zero diffracted orders and being of a size capable of passing the modulated side bands containing the input scene information and phase shift means for changing the phase relation between the light passed by central and side apertures.

2. The spatial filter of claim 1 wherein said side apertures are centered about the focal spots of the two first diffracted orders associated with the carrier wave frequency.

3. The apparatus of claim 1 wherein said phase shift means includes light retarding means for changing the optical path length of one of the diffracted orders passing through the mask.

4. The apparatus of claim 1 wherein said phase shift means includes a light retarding means mounted in the central aperture of the mask which is arranged to change the optical path length of the zero diffracted order in relation to the side diffracted orders.

5. The apparatus of claim 4 wherein said side apertures comprise two clear apertures positioned equally distant from said centrally located aperture such that all three apertures lie along a common line in the plane of said mask.

6. Apparatus for recovering data stored on the surface of a receptor in the nature of deformations having a periodic carrier wave and a carrier modulating signal containing the input scene information including means to support the deformed surface of the receptor in a plane, means to direct a plane wave front of light incident upon the deformed surface of said receptor whereby the light is diffracted in accordance with the carrier wave frequency, a lens positioned to focus the diffracted light beams at a point in the focal plane of said lens, a spatial filter positionable in and about the focal plane of said lens for passing substantially the entire Airy disc of the zero diffracted order and at least one side diffracted order, a viewing screen located at an image plane of said lens and a carriage rigidly coupling said lens and filter relative to each other and supported for movement relative to said receptor and viewing screen to alter the optical path of light passed by the filter to change the phase relation of the light passed by the central aperture relative to the light passed by side apertures.

7. The apparatus of claim 6 wherein said spatial filter comprises a relatively thin opaque mask having a central aperture located about the focal spot of the zero diffracted order of a size to pass less than all the entire Airy disc and at least two side apertures therein located about the focal spots of some non-zero diffracted order and of a size to pass the side diffracted orders containing the input scene information.

8. The apparatus of claim 7 wherein said spatial filter has side apertures arranged to pass the two first diffracted orders associated with the carrier wave frequency.

9. The apparatus of claim 6 wherein said opaque mask includes two side apertures located equal distance from the central aperture such that all the apertures lie along a common line in the plane of the mask and the line extending perpendicular in relation to the periodic carrier waves.

10. The apparatus of claim 6 further including detecting means to sense the image passed by the spatial filter which is presented in the read-out plane of the system.

11. The apparatus of claim 10 wherein said detecting means to sense the image in the read-out plane of the system includes scanning means having a response capable of recording a signal voltage proportional to the intensity of the image in the read-out plane of the lens, and electrical means to demodulate the carrier frequency component of the signal voltage corresponding with the interference frequency of the zero diffracted order and the transmitted diffracted orders associated with the carrier wave frequency.

* * * * *